Jan. 7, 1930.  A. DABRASKY  1,742,436

TRUNNION BEARING FOR ORDNANCE

Filed June 28, 1928

Inventor
August Dabrasky

By W. N. Roach

Attorney

Patented Jan. 7, 1930

1,742,436

UNITED STATES PATENT OFFICE

AUGUST DABRASKY, OF WASHINGTON, DISTRICT OF COLUMBIA

TRUNNION BEARING FOR ORDNANCE

Application filed June 28, 1928. Serial No. 288,983.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a trunnion bearing for ordnance.

In guns which must be capable of delivering a rapid fire against swiftly moving targets such as aircraft, the elevating mechanism is under continuous operation either by manual control or through an electric motor which is associated with the apparatus for ascertaining the firing data.

In order to permit accuracy in pointing as well as rapidity and facility of operation I propose to incorporate in the trunnion bearing an anti-friction mechanism which may be adjusted to remove any clearance or looseness that may develop.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein.

Figure 1:
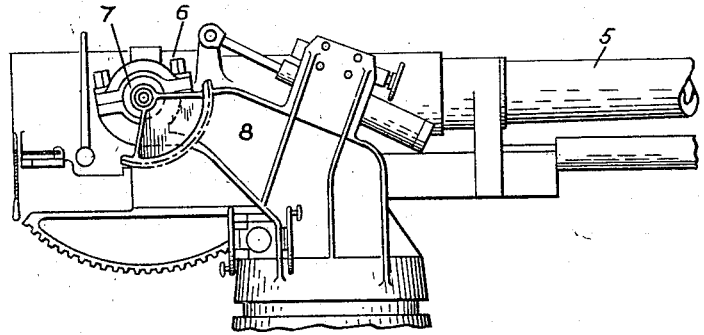
Fig. 1 is a fragmentary view in side elevation of gun.
Figures 2, 3:
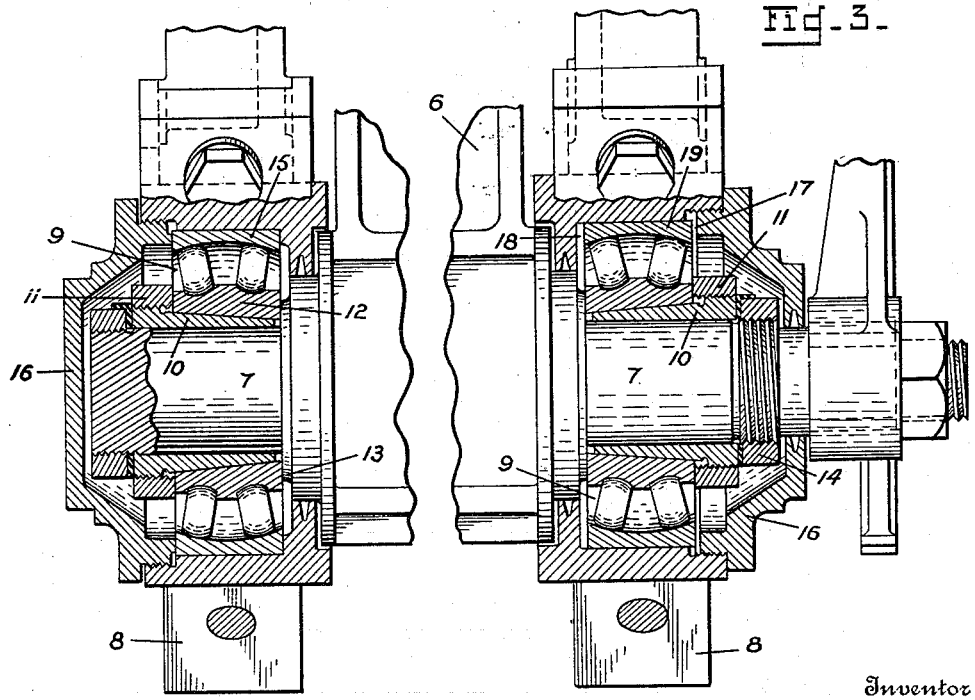
Figs. 2 and 3 are horizontal sectional views, respectively, of the left and right trunnion bearings.

Referring to Fig. 1 there is shown a gun of typical anti-aircraft design comprising a barrel 5 reciprocally mounted in a cradle 6 which is provided with trunnions 7 supported in a rotatable top carriage 8.

Each of the trunnions is embraced by a self-alining roller bearing assembly 9 of standard design having an adaptor 10 for fitting the bearing to the trunnion. A nut 11 threaded on the adaptor holds the inner race 12 in place against a shoulder 13 of the trunnion while a nut 14 threaded on the trunnion provides for adjustably retaining the adaptor in position. The outer race 15 on the left trunnion is firmly secured to the top carriage by means of a cap 16 while on the right trunnion a lateral clearance indicated at 17 and 18 is maintained between the outer race 19 and its support for the purpose of allowing for expansion and contraction of the cradle.

I claim:

1. In a gun mount, a top carriage, a gun cradle having trunnions supported by the top carriage, a self-alining roller bearing assembly embracing each trunnion, means for restraining one of the bearing assemblies against lateral movement with respect to the top carriage and means for limiting lateral movement of the other bearing with respect to the top carriage.

2. In a gun mount, a top carriage, a gun cradle having trunnions supporting the top carriage, and a self-alined antifriction bearing assembly embracing each trunnion.

AUGUST DABRASKY.